United States Patent Office 3,096,193
Patented July 2, 1963

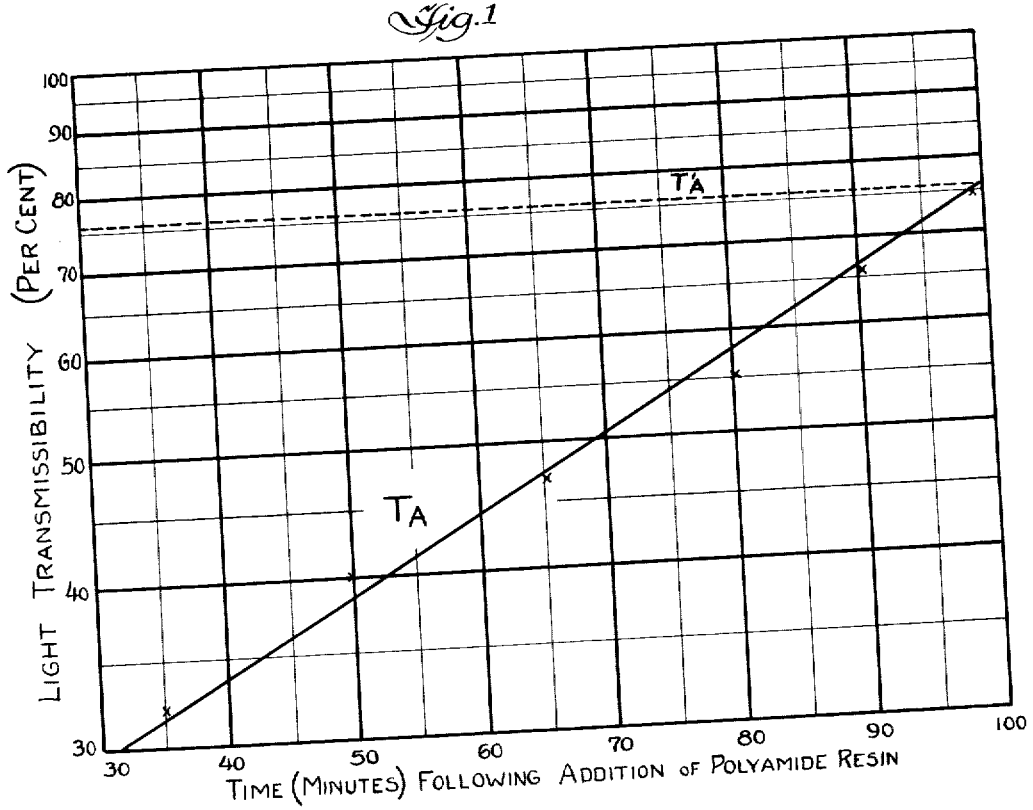
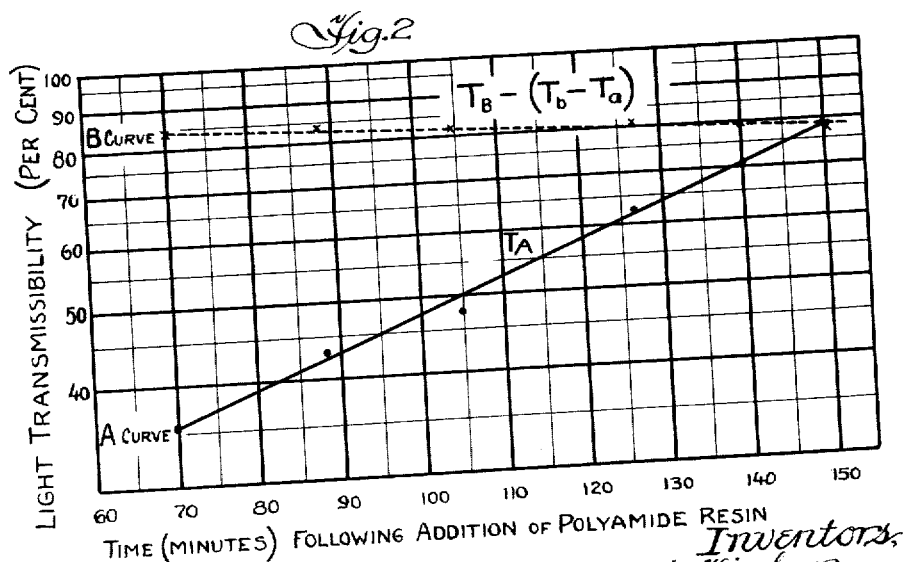

3,096,193
METHOD FOR END POINT DETERMINATION IN THE PRODUCTION OF THIXOTROPIC POLYAMIDE-MODIFIED VEHICLES
George H. Tinker, Skokie, and William B. Winkler, Arlington Heights, Ill., assignors to T. F. Washburn Company, Chicago, Ill.
Filed June 23, 1958, Ser. No. 743,698
17 Claims. (Cl. 106—287)

This invention relates to processes for the production of vehicle bases used in the formulation of thixotropic polyamide-modified coating vehicles, and more particularly refers to methods for predicting and determining the end point in the process for reacting a polyamide resin with an ester base material to provide paint, varnish and ink vehicles having thixotropic properties and suitable for forming coating materials having greatly improved properties.

Coating vehicles are comprised of a vehicle base or binder, and a vehicle solvent. The coating vehicles are subsequently formulated with pigments, and, in some cases, with additional solvent, to produce coating compositions. This invention is primarily concerned with the production of the vehicle bases.

The basic process for the production of coating vehicle bases containing a polyamide resin dispersed therein and the products resulting from the process are disclosed in U.S. Patent No. 2,663,649, issued December 22, 1953, to William B. Winkler. Also disclosed therein is a method for determining the end point of the reaction, said method comprising what is therein referred to as a "cloud test." In carrying out this test a one part sample of the reaction mixture is mixed with nine parts of mineral spirits, heated, and then cooled to room temperature. The end point is determined as that point at which the mixture, when compared to previously prepared standards, shows no graininess and has maximum turbidity and a cloudy appearance. Although this method has been successfully used in the commercial production of paint and varnish vehicles produced in accordance with the above-named patent, the method has the apparent shortcomings of depending to too great a degree on human judgment and experience in observing the sample and comparing it with the standard, or, in the case of an experienced operator, in comparing the sample with a mental picture of the standard. Moreover, this method has not enabled one to predict at what time the end point would be reached, with the consequence that a large number of tests must be made periodically during each reaction process in order to attain the desired properties in the final product.

A somewhat more refined method for end point determination in the above-referred-to reaction has been disclosed in pending application Serial No. 625,322, now U.S. Patent 2,962,461 for Method for Determining End Point of Polyamide Modified Vehicle Cooks, of Norbet F. Toussaint, et al. According to the method therein disclosed, a sample of the reaction product is placed in a particular solvent such as butyl acetate in an amount sufficient to provide a solution containing, preferably, from two to thirty percent by weight of the reaction product. The required solvent is one in which the ester base material and the reaction or digestion product of the ester base material with the polyamide resin is completely soluble therein at room temperature as well as at elevated temperatures; however, the undigested polyamide resin must be soluble in the solvent at elevated temperatures, but substantially insoluble at room temperature. Light transmissibility tests are taken at intervals and a curve of light transmissibility against time plotted. From this curve the time at which the desired transmissibility will have been attained can be determined. The products resulting from the above described testing method have been found suitable for use as vehicles for formulation of non-gloss paints and varnishes. However, it has been found that, although the vehicle bases themselves produced according to this method may initially show gloss properties, when thinned to the final consistency, they produce paints and varnishes which exhibit poor gloss.

It is a primary object of the present invention to provide a process for the reaction of an ester base with a polyamide resin to produce modified protective coating vehicle bases which may be formulated with vehicle solvents to produce paints and varnishes which are thixotropic and which have excellent gloss properties, and to produce thixotropic inks having the properties generally desired in such products.

It is a further object to provide a method for precisely determining the end point of reactions between an ester base and a polyamide resin to produce such modified vehicle bases.

It is still further an object to provide an improved method for determining the reaction end point between an ester base and a polyamide resin which may be used even where the reaction product becomes colored during the course of the reaction to a degree which would hinder the accurate end point determination by previous methods.

It is a further object to provide such a method which is effective even when the initial ester base exhibits some cloudiness.

It is still further an object to provide novel polyamide-modified ester base vehicle which may be used to produce coating compositions exhibiting excellent properties.

Other objects and advantages of the invention will become apparent from the following description and accompanying drawing.

It has been found that if an ester base and a polyamide resin are reacted togtther at an elevated temperature until a test solution prepared from a sample of the reaction mixture becomes clear at room temperature, the reaction product can be used as a vheicle base to form thixotropic protective coating materials having excellent gloss properties and thixotropic inks which are substantially free from seeding and syneresis. The test solution is prepared by dissolving the test sample in a hydrocarbon solvent which is used as the vehicle solvent to formulate the ultimate protective coating composition. Of course any solvent which is equivalent to the vehicle solvent in its solubilizing properties may also be used and is to be considered as being covered by the term "vehicle solvent." The concentration of the sample in the solution should be at least 25% by weight, and preferably should be approximately the same as the concentration of the reaction product in the coating vehicle.

It has been further found that a more accurate and precise determination of the end point of the reaction, and one which will automatically compensate for the production of color in the reaction mixture, may be obtained if the end point of the reaction is determined as the point at which the percent light transmissibility of a sample of the reaction mixture when heated and dispersed in the vehicle solvent as described above is equal to the transmissibility of a solution formed by dissolving a second sample of the reaction mixture in a solvent in which all components, the reactants and the reaction product, are soluble at room temperature.

It has been further found that the end point determination may be made even more accurate by introducing a correction factor which compensates for the presence of cloudiness in the initial ester base.

It has been still further found that the end point of such a reaction between an ester base and a polyamide resin to form a polyamide resin-modified ester vehicle base may be predetermined during the reaction process with great precision by extrapolation.

The ester base and the polyamide resin used to produce the modified ester vehicle are normally insoluble in and incompatible with each other. During the course of the reaction, the polyamide resin gradually disperses or reacts into the ester base. As the reaction continues, more of the polyamide resin is absorbed into the ester base until, when the polyamide is completely dispersed, the reaction product becomes a clear soupy liquid. Where the final product is carried to that point, the resulting liquid does not exhibit the desirable thixotropic properties. Insufficient digestion, on the other hand, results in a grainy product which is not only difficult to filter properly but which also lacks the desired degree of thixotropy. Other properties of the finished paint, varnish or ink such as the degree of gloss, in addition to thixotropy, are affected by the degree of completion of the reaction.

In order to facilitate the discussion and development of the present invention the symbols defined immediately below will be used to designate various entities and values:

A solvent—a hydrocarbon commonly used in the art as a coating composition solvent, and in particular one in which the ester base and reaction product are soluble at both elevated temperatures and at room temperature, but in which the polyamide resin is not soluble at room temperature.

B solvent—a single solvent or mixture of solvents in which all components, the ester base, polyamide, and reaction product are soluble at room temperature.

$T_A$—light transmissibility in percent of a test solution of a sample of the reaction mixture in an A solvent which is the vehicle solvent and which will subsequently be used to dilute the reaction product, the concentration of the reaction mixture in the A solvent being at least 25% by weight when no concentration is stated, or at the stated concentration.

$T_A'$—value for $T_A$ of test solution at clarity, previously determined by a trial reaction, and which value is used as a target for extrapolating the end point of subsequent reactions.

$T_B$—light transmissibility in percent of a test solution of a sample of the reaction mixture in a B solvent in the same concentration as used to determine $T_A$.

$T_a$—light transmissibility in percent of a test solution of a sample of the ester base in the same A solvent and same concentration as used to determine $T_A$.

$T_b$—light transmissibility in percent of a test solution of a sample of the ester base in the same B solvent and same concentration as used to determine $T_B$.

Because of the variation from batch to batch in the properties of both the ester base and the polyamide resin, a time-temperature curve produced as a result of testing one particular batch at various intervals in the reaction process cannot be used to predict the end point of a different batch. Such variables which include acid number, reactivity of the materials, especially of the ester condensation product, and non-uniformity of the polyamide resin materially affect the rate of the digestion reaction. Consequently each batch must be individually controlled in order to compensate for these variables.

Careful study of the processes and products described in the Winkler patent shows that, for a given reaction formula, such properties as degree of thixotropy and clarity of the finished products of the reaction are related to the concentration of undigested polyamide resin present in substantially colloidal form in the material. The reaction mixture, as is explained in greater detail in the patent referred to, comprises a selected ester base material, such as an alkyd resin, ester oils, varnish ester bodies, or other vehicle base materials or mixtures thereof, and a polyamide resin of the type described in the patent. In commercial production, the hard, thermoplastic form of polyamide resins manufactured and sold by General Mills, Inc. under the trademark "Versamid," types 900, 930, 940 and 950, have been generally used. The polyamide resin is a minor constituent of the reaction mixture. Maintenance of the reaction at an elevated temperature results in the gradual dispersion or digestion of the polyamide resin in the base material, apparently to form an interchange digestion product. Thus, the concentration of undigested polyamide resin in the reaction mixture gradually decreases. The problem is to determine the time at which the reaction should be discontinued, indicated by the optimum concentration of undigested polyamide resin in the cook, at which point the finished product will have the desired physical and chemical properties.

The major accomplishment of the present invention is the precise end point determination for the production of products which have been reacted to a somewhat greater degree than those made by previous methods, but which still retain their thixotropic properties. As a result of their more complete reaction, the products of the present invention will produce protective coating materials which exhibit better gloss properties than the products made by the previous methods. The precision offered by the present methods was not inherent in the previous methods referred to, and therefore the previous methods required the discontinuation of the reaction before the optimum degree of reaction had been attained. The consequences have been that although thixotropic polyamide-modified vehicles have been produced according to the Winkler patent by the use of the end point determination methods of either the patent or the application described above, the vehicles have not been satisfactory for the production of protective coatings having as great a degree and permanence of gloss as those produced from the present vehicles.

An understanding of the basic concepts of the present invention can best be gained by reference to the attached graphs in which:

FIG. 1 is a graph of test data obtained from measurements made in the process described in Example 2 wherein the basic method of the invention is described; and FIG. 2 is a graph of tests obtained by carrying out the reaction according to the improved method, the data for which was obtained by the method described in Example 3.

FIG. 1 shows a graph produced by plotting the percent light transmissibility of test solutions throughout the course of the reaction against time of reaction. The time coordinate is chosen as a linear function and the percent light transmissibility is plotted on a single cycle logarithmic scale. The object of the method is to predetermine the point of time at which a polyamide-modified ester vehicle base will have been produced, which, when diluted with the vehicle solvent to the customary paint, varnish or ink consistency, will produce such products having the desired properties. This is accomplished by measuring the light transmissibility of at least two test samples produced as described above, and extrapolating the data, such as by extending a curve drawn through the points until the line crosses a predetermined target value. Where the previous tests for determining end point have been solely arbitrary, the present method attempts to duplicate substantially the same conditions in the test sample as in the coating composition which is to be produced, and allows the reaction to be carried out and stopped at the point where the product may be used as a vehicle to produce the desired compositions.

According to the basic concepts of the invention, the concentration of the reaction product in the vehicle solvent to form the test solution should approximate that of the vehicle base in the protective coating composition as explained above. Since vehicle base concentrations of about 50% are often used, that concentration may be used to perform the tests. It has been found, however, that a slightly reduced concentration, such as 40% may be advantageously used for the preparation of vehicle bases subsequently used in 50% concentration protective coatings. The difference of 10% constitutes a safety factor. However, the concentration should not go below 25%, since reactions carried to the point where test solutions containing les than 25% of the reaction product reach clarity may lose their thixotropic properties and become unsuitable for use in making thixotropic paints, varnishes and inks.

The present method may be carried out by making successive tests until a point is obtained at which a test solution of the reaction product prepared as described above reaches clarity. However, in practice, for the purpose of predetermining the end point, it has been found convenient to measure $T_A$ of test samples produced in the manner described above and taken at at least two points during the reaction process, and to plot the values on a graph as in FIG. 1. The plotted points form substantially a straight line. The perecnt of light transmissibility at clarity, $T_A{}'$, may be previously determined on a test sample and used as a target for the end point. The time at which the end point will be attained may then be extrapolated when at least two points have been determined on the curve. In FIG. 1, the value of 77% for $T_A{}'$ previously determined is used as the target in the present reaction, the details of which are described below in Example 2.

FIG. 2 is a graph illustrating the improved method of the present invention. In this method test samples are removed at intervals, dissolved in the vehicle solvent for determining $T_A$ as described in relation to the first method, and the values for $T_A$ are plotted to produce the curve which is designated herein as the A curve. However, at the time each sample is removed it is divided into two parts. The first part is used to determine $T_A$ to plot the A curve. The second part is dissolved in what is herein called a B solvent in substantially the same concentration in which the A curve test solutions are prepared. In preparing the B solvent, it has been found desirable to use as much as possible of the A solvent to produce a B solvent mixture in order to duplicate the A solvent as closely as possible, while still providing a solvent in which all components are soluble. To accomplish this objective sufficient butanol is added to the A type solvent until all components are soluble. In practice a suitable formulation for measuring $T_B$ may be produced from 40 parts reaction mixture, 40 parts mineral spirits, and 20 parts butanol. Where no color develops during the reaction process, the measured value for $T_B$ will not change throughout the reaction. Where, however, as usually occurs, the color of the reaction mixture becomes increasingly darker, the value $T_B$ will decrease slightly during the course of the reaction. The $T_B$ values are plotted to produce what is herein called the B curve. The intersection of the A curve and the B curve denote the end point, since, at this point, the test solution of the A curve attains clairity as determined by the $T_B$ values which automatically introduce a correction factor for color.

Where the ester base initially contains cloudiness caused by such factors as the presence of a catalyst, a further correction factor may be introduced which is herein called a base check. The base check is made by taking two samples of the ester base just prior to the addition of the polyamide resin. One sample is dissolved in the A solvent and one in the B solvent, in the same proportion as the tests made to determine $T_A$ and $T_B$. The transmissibilities of the solutions are then measured and designated as $T_a$ and $T_b$ respectively. These values are then subtracted and the difference, $T_b - T_a$, is subtracted from each measured value of $T_B$, the resulting quantity $T_B - (T_b - T_a)$ being plotted as the B curve, as shown in FIG. 2.

After at least two values for plotting each curve have been obtained, the curves, being substantially straight lines, may be extrapolated to their point of intersection, the abscissa of the point indicating the time at which the end point will be reached.

The following examples illustrate the preparation of polyamide resin-modified ester vehicle bases, and the determination of the end point of the reaction by both of the methods herein disclosed.

*Example 1*

Sixty grams of soya bean oil or linseed oil are heated together with 205 grams refined or distilled tall oil, containing 50 to 60 percent fatty acid to a temperature of 450° F. To this mixture are added 74 grams pentaerythritol and 0.1 to 0.5 gram of a catalyst such as lime hydrate, or litharge. The temperature is maintained within the range of 450–460° F. for alcoholysis to take place, as determined by a conventional test such as the clarity of a solution containing one part of base and four parts of methyl alcohol. To this solution are then added 76 grams phthalic anhydride and 9 grams of maleic anhydride. The mixture is heated to 500° F. and held until an acid member of 10 or less is obtained, and a viscosity W-Z (Gardner-Holdt) at 50% solids in mineral spirits are obtained. The temperature is preferably lowered somewhat toward the end of this part of the reaction. The resulting product is an alkyd base suitable for use in the present invention.

The following example illustrates the carrying out of the reaction between the alkyd base and the polyamide resin, using the first method of the present invention to determine the end point of the reaction.

*Example 2*

The reaction mixture prepared above in Example 1 is heated to a temperature of between 430–450° F. At this point 20 grams of a polyamide resin such as "Versamid," types 900, 930, 940 or 950, are added. Heating of the reaction mixture is maintained at the temperature. At various time intervals, samples of the reaction mixture are removed for testing on a Lumitron colorimeter using a 650 millimicron filter to determine the $T_A$ values. To make this determination, the sample is first dissolved in an A type solvent, that is, the vehicle solvent or its equivalent which is to be used to prepare the final protective coating material, and in a concentration similar to that of the ultimate coating composition. For example, for the purposes of the present example let it be assumed that it is desired to prepare a protective coating material using mineral spirits as a solvent and having a final vehicle base content of about 50%. Consequently, in order to carry out this test according to the invention, each test sample is dispersed into a solution of mineral spirits in approximately the ratio of 50 parts of solid to 50 parts solvent. In order to include a safety factor, however, as described above, it has been found advantageous to use 40 parts of reaction product to 60 parts of mineral spirits. The resulting mixture is then heated to dissolve the sample in the mineral spirits, and cooled to room temperature for testing. The value $T_A$ is then determined on a colorimeter. As each value for $T_A$ is determined, it is plotted on the graph shown in FIG. 1 whose coordinates are light transmissibility in percent and time of reaction in minutes. In order that a straight line will be obtained, single cycle semi logarithmic graph paper is used with the percent transmissibility plotted on the logarithmic scale. Values are determined and plotted at intervals of about 15 minutes. The value of $T_A{}'$ ($T_A$ at clarity) was previously determined for the particular ingredients to be 77%. After several points on the graph have been plotted, a straight line is drawn through them and extrapolated until it intersects the 77% transmissibility line. The corresponding time intercept indicates the end point time. Just prior to the prognosticated end point time, the test sample is taken and the transmissibility measured for verification. At the predetermined end point time, the reaction mixture is pumped out of the reactor. As determined in FIG. 1, the end point was reached at about 100 minutes.

The following example illustrates the improved method for determining the end point of the reaction in which a polyamide-modified ester vehicle base is produced.

*Example 3*

An alkyd resin as prepared above in Example 1 is utilized as the ester base. If the ester base is free from clouding, the resin may be heated and the polyamide added to begin the reaction process. However, if the ester base contains some cloudiness, a base check should first be made in order to obtain a correction factor to compensate for initial cloudiness of the ester base. To obtain the base check correction, a sample of the ester base is dissolved in the vehicle solvent such as mineral spirits by heating in the proportion of about 40 parts alkyd base to 60 parts mineral spirits to determine the value $T_a$. A second sample is dissolved in a B type solvent in the ratio of 40 parts of ester base with 40 parts of mineral spirits and 20 parts of butanol to determine the value for $T_b$. The difference, $T_a-T_a$ is subtracted from each subsequent $T_B$ reading during the course of the reaction and the corrected values plotted. The value $T_b-T_a$ constitutes a correction factor for the initial cloudiness of the ester base. In the present example the values of $T_a$ and $T_b$ were measured as 88% and 90% respectively, giving a correction factor of 2%.

To initiate the reaction, the ester base is heated to a temperature of between 430–450° F. Twenty grams of the polyamide resin are added, and heating is continued. At periodic intervals samples of the reaction mixture are removed and divided into two portions. One part is dispersed in the A solvent such as mineral spirits in the ration of 40 parts reaction product to 60 parts mineral spirits by first heating and then cooling to room temperature. The transmissibility of each sample is measured and the A curve plotted in FIG. 2 from the determined $T_A$ points. The second sample is dissolved with heat in a B solvent in the ratio of 40 parts sample, 40 parts mineral spirits, and 20 parts butanol. The solution is cooled to room temperature and the transmissibility measured as $T_B$. If a base check correction is found necessary, the correction value is subtracted from each value of $T_B$, and the value $T_B-(T_b-T_a)$ is then used to plot the B curve. If no correction is found necessary, the $T_B$ values themselves are plotted. After several samples have been tested and at least two points determined for each curve, the curves are extrapolated to their intersection. The abscissa of the point of intersection between the A and B curves denotes the time at which the end point of the reaction will have been attained. A short time prior to the time of the extrapolated end-point it is desirable to make a final test of the reaction product to verify the fact that the curves are closely approaching each other. When the test indicates the end point has been reached, the reaction mixture is pumped out of the reaction vessel and cooled.

The results of the tests made from the above-described reaction are plotted in FIG. 2. A correction factor for $(T_b-T_a)$ of 2% was used. As shown on the graph, the time of end point as indicated by the abscissa of the point of intersection of the two curves is 149 minutes.

The examples below contain formulas for different types of modified thixotropic alkyd vehicle bases. In each case the ester base is prepared in a manner similar to that of Example 1, and the polyamide subsequently added and reacted according to either the method of Example 2 or the method of Example 3.

*Example 4*

Medium oil, rosin modified thixotropic ester base modified by polyamide resin.

| | Grams |
|---|---|
| Refined linseed oil or refined soya bean oil | 60 |
| Distilled tall oil (50–60% fatty acid) | 205 |
| Technical pentaerythritol | 74 |
| Lime hydrate | 0.1–0.5 |
| Phthalic anhydride | 76 |
| Maleic anhydride | 9 |
| Polyamide resin | 20 |

*Example 5*

Long oil, rosin free thixotropic ester base modified by polyamide resin.

| | Grams |
|---|---|
| Refined soya or linseed oil | 1125 |
| Technical pentaerythritol | 310 |
| Lime hydrate | 0.5 |
| Phthalic anhydride | 540 |
| Polyamide resin | 36 |

*Example 6*

Short oil, thixotropic ester base modified by polyamide resin.

| | Grams |
|---|---|
| Dehydrated castor fatty acids | 158.0 |
| Dehydrated castor oil | 158.0 |
| Phthalic anhydride | 462.3 |
| Benzoic acid | 28.1 |
| Pentaerythritol | 134.5 |
| Ethylene glycol | 212.0 |
| Polyamide resin (Versamid P–90) | 23.2 |
| Xylol | 749.0 |

Heat castor fatty acids, castor oil, one-half of the phthalic anhydride, and benzoic acid together to 450° F., then add pentaerythritol and balance of phthalic anhydride. Prepare for glycol reflux and add ethylene glycol. Heat to 450°–460° F. and hold until viscosity reaches I-K at 50% non-volatile content in xylol.

A base check sample is now taken, reduced to 50% solids in xylol, and divided into two parts. Tube "A" is reduced to 40% solids in xylol and tube "B" is reduced to 40% solids in butanol.

The polyamide resin is then added to the cook and temperature held at 440–480° F. until end point is reached. The completed vehicle base material so prepared may then be thinned to 60% non-volatile content by addition of xylol.

The ester bases used for preparing the vehicles of the present invention may be any of the ones disclosed in the Winkler patent above-referred to, or ester bases known in the art generally. The bases are generally prepared by reacting an alcohol with a polybasic acid with or without a catalyst. The alcohols may be monohydric or polyhydric. The bases may be modified by various oils such as soya bean oil or linseed oil. Synthetic ester oils such as the reaction product of fatty acids with polyhydric alcohols may also be used. Additional ester bases which may be used are alkyd resins formed by the reaction of a polybasic acid with a polyhydric alcohol. Still other suitable types are varnish ester bodies comprising the reaction products of oils with oil-soluble resins such as phenolic resins, maleic resins, epoxy resins, and polymerized by hydrocarbon resins.

Polyamide resins suitable for use in the present invention are the reaction products of polymerized unsaturated fatty acids such as dimerized and trimerized acids with an alkylene polyamine having from two to four amine substituents. Examples of such resins presently commercially available are those manufactured and sold by General Mills, Inc. under the trademark "Versamid," types 900, 930, 940, 950, and P–90. Other resins, including those mentioned in the Winkler patent, No. 2,663,649, may be used.

"Versamids" are prepared by the condensation of polymerized linoleic acid with polyamines according to the following equation:

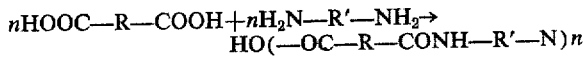

R, R' and n in the equation above vary in the different grades of "Versamids." Of the grades referred to above, "Versamid 900" is a hard, brittle, high melting point resin. "Versamid 930" and "Versamid 940" are tough resins more flexible than "Versamid 900." "Versamid 950" is a specially compounded form of "Versamid 940." "Versamid P-90" has a structure similar to that of the other "Versamids."

The solvents which may be used with the present vehicle bases for the preparation of coating compositions are hydrocarbons with boiling points falling in the range of 200–600° F. The most common is the family of mineral spirits among which are the mild odor mineral spirits and odorless mineral spirits. Aromatic hydrocarbons such as xylene and toluene may also be used for particular compositions. Additional solvents suitable for specialized purposes are paraffinic hydrocarbons, light mineral oils, and low boiling naphthas.

The solvents used as the B type solvent may be taken from various types, among which are esters, alcohols, ketones, etc. The primary requisite is that the solvents be relatively free from color, and that all the components of the reaction—the ester base, the polyamide resin, and the reaction product all be soluble in the solvent at room temperature. The most suitable solvent has been found to be butanol. Butanol may also be used in conjunction with mineral spirits as a B type solvent if sufficient butanol is incorporated to render the components in question completely soluble in the solvent mixture.

Invention is claimed as follows:

1. A process for the production of a vehicle base suitable for formulation with a predetermined vehicle solvent consisting essentially of a hydrocarbon having a boiling point falling in the range of 200°–600° F. for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until a test solution of the reaction product in said vehicle solvent, wherein said test solution contains said reaction product in an amount at least 25% by weight, is clear at room temperature.

2. A process for the production of a vehicle base suitable for formulation with a predetermined vehicle solvent consisting essentially of a hydrocarbon having a boiling point falling in the range of 200°–600° F. for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until a test solution of the reaction product in said vehicle solvent, wherein said test solution contains said reaction product in a concentration approximately the same as the concentration of said reaction product in said coating compositions, but being at least 25% by weight of said test solution, is clear at room temperature.

3. A process for the production of a vehicle base suitable for formulation with mineral spirits for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until a test solution of the reaction product in mineral spirits, wherein said test solution contains said reaction product in an amount at least 25% by weight, is clear at room temperature.

4. A process for the production of a vehicle base suitable for formulation with xylene for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until a test solution of the reaction product in xylene, wherein said test solution contains said reaction product in an amount at least 25% by weight, is clear at room temperature.

5. A process for the production of a vehicle base suitable for formulation with mineral spirits for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until a test solution of the reaction product in mineral spirits, wherein said test solution contains said reaction product in an amount from about 40% to about 50% by weight—is clear at room temperature.

6. In a process for the production of a vehicle base suitable for formulation with a predetermined vehicle solvent consisting essentially of a hydrocarbon having a boiling point falling in the range of 200°–600° F. for the production of thixotropic coating compositions by reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies, the improvement which comprises a method for predetermining the end point time, said method comprising the steps of determining values for $T_A$ at at least two different times during the reaction process, and extrapolating the values to determine the end point time at which $T_A$ equals $T_A'$; wherein $T_A$=light transmissibility in percent of a test solution containing a sample of the reaction mixture in said predetermined vehicle solvent, wherein said test solution contains said reaction product in an amount at least 25% by weight; and $T_A'$ is the light transmissibility in percent of a test solution containing a previously prepared reaction product in the same vehicle solvent and same concentration as used in the test solution for determining $T_A$, and wherein said reaction process has been carried to the point where said test solution is clear at room temperature.

7. A process for the production of a vehicle base suitable for formulation with a predetermined vehicle solvent consisting essentially of a hydrocarbon having a boiling point falling in the range of 200°–600° F. for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until the following relationship is established:

$T_A = T_B$; wherein $T_A$=light transmissibility in percent of a test solution of the reaction product in said vehicle solvent, wherein said test solution contains said reaction product in an amount at least 25% by weight; and $T_B$=light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$.

8. A process according to claim 7 wherein the test solution used to determine $T_A$ contains said reaction product in a concentration approximately the same as the concentration of said reaction product in said coating composition.

9. A process for the production of a vehicle base suitable for formulation with mineral spirits for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until the following relationship is established:

$T_A = T_B$; wherein $T_A$ = light transmissibility in percent of a test solution of the reaction product in mineral spirits wherein said test solution contains said reaction product in an amount from about 40% to about 50% by weight; and $T_B$ = light transmissibility in percent of a test solution comprised of 40% reaction product, 40% mineral spirits, and 20% butanol by weight.

10. In a process for the production of a vehicle suitable for formulation with a predetermined vehicle solvent consisting essentially of a hydrocarbon having a boiling point falling in the range of 200°–600° F. for the production of thixotropic coating compositions by reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies, the improvement which comprises a method for predetermining the end point, said method comprising the steps of determining values for both $T_A$ and $T_B$ at at least two different times during the reaction process, and extrapolating the two sets of values to determine the end point time at which $T_A = T_B$; wherein $T_A$ = light transmissibility in percent of a test solution of the reaction product in said vehicle solvent wherein said test solution contains said reaction product in an amount at least 25% by weight; and $T_B$ = light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$.

11. A process for the production of a vehicle base suitable for formulation with a predetermined vehicle solvent consisting essentially of a hydrocarbon having a boiling point falling in the range of 200°–600° F. for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until the following relationship is established:

$T_A = T_B - (T_b - T_a)$; wherein $T_A$ = light transmissibility in percent of a test solution of the reaction product in said vehicle solvent wherein said test solution contains said reaction product in an amount at least 25% by weight; and $T_B$ = light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$;

$T_a$ = light transmissibility in percent of a test solution of the ester base in said vehicle solvent in the same concentration as the concentration of said reaction product in the test solution used to determine $T_A$; and $T_b$ = light transmissibility in percent of a test solution of the ester base in the same solvent and at the same concentration as the concentration of said reaction product in the test solution used to determine $T_B$.

12. A process according to claim 11 wherein the test solution used to determine $T_A$ contains said reaction product in a concentration approximately equal to that of the concentration of the reaction product in said coating compositions.

13. A process for the production of a vehicle base suitable for formulation with mineral spirits for the production of thixotropic coating compositions which comprises reacting with heat a polyamide resin, comprising the reaction product of polymerized fatty acid with an alkylene polyamine having from two to four amine substituents, with an ester base selected from the group consisting of glyceride oils, oil-modified alkyd resins and varnish ester bodies until the following relationship is established: $T_A = T_B - (T_b - T_a)$; wherein $T_A$ = light transmissibility in percent of a test solution of the reaction product in mineral spirits in the proportion by weight of 40% reaction product and 60% mineral spirits;

$T_B$ = light transmissibility in percent of a test solution comprised of 40% reaction product, 40% mineral spirits and 20% butanol by weight;

$T_a$ = light transmissibility in percent of a test solution comprised of 40% ester base and 60% mineral spirits by weight; and $T_b$ = light transmissibility in percent of a test solution comprised of 40% ester base, 40% mineral spirits, and 20% butanol by weight.

14. A process for the production of a vehicle base siutable for formulation with a xylene for the production of thixotropic coating compositions which comprises reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies until the following relationship is established: $T_A = T_B - (T_b - T_a)$; wherein $T_A$ = light transmissibility in percent of a test solution of the reaction product in xylene in the proportion by weight of 40% reaction product and 60% xylene;

$T_B$ = light transmissibility in percent of a test solution comprised of 40% reaction product, 40% xylene and 20% butanol by weight;

$T_a$ = light transmissibility in percent of a test solution comprised of 40% ester base and 60% xylene by weight; and $T_b$ = light transmissibility in percent of a test solution comprised of 40% ester base, 40% xylene, and 20% butanol by weight.

15. In a process for the production of a vehicle base suitable for formulation with a vehicle solvent consisting essentially of a hydrocarbon having a boiling point falling in the range of 200°–600° F. for the production of thixotropic coating compositions by reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies, the improvement which comprises a method for predetermining the end point time, said method comprising the steps of determining values for both $T_A$ and $T_B-(T_b-T_a)$ at at least two different times during the reaction process, and extrapolating each set of values to determine the end point time at which $T_A=T_B-(T_b-T_a)$; wherein $T_A$ = light transmissibility in percent of a test solution of the reaction product in said vehicle solvent wherein said test solution contains said reaction product in an amount at least 25% by weight;

$T_B$ = light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$;

$T_a$ = light transmissibility in percent of a test solution of said ester base in said vehicle solvent in the same concentration as the concentration of said reaction product in the test solution used to determine $T_A$; and $T_b$ = light transmissibility in percent of a test solution of the ester base in the same solvent and at the same concentration as the concentration of said reaction product in the test solution used to determine $T_B$.

16. In a process for the production of a vehicle use suitable for formation with a predetermined vehicle solvent consisting essentially of a hydrocarbon having a boiling point falling in the range of 200°–600° F. for the production of thixotropic coating compositions by reacting with heat a polyamide resin, comprising the reaction product of a polymerized fatty acid with an alkylene polyamine having from two to four amine substituents, with an ester base selected from the group consisting of glyceride oils, oil-modified alkyd resins and varnish ester bodies, the improvement which comprises a method for predetermining the end point time, said method comprising the steps of determining the values for $T_A$ and $T_B-(T_b-T_a)$ at at least two different times during the reaction process, plotting a graph with the values obtained, using time and light transmissibility in percent as the coordinates, and extrapolating the curves formed by the plotted points to determine the point in time at which the extrapolated curves cross; wherein $T_A$ = light transmissibility in percent of a test solution of the reaction product in said vehicle solvent wherein said test solution contains said reaction product in an amount at least 25% by weight;

$T_B$ = light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$;

$T_a$ = light transmissibility in percent of a test solution of the ester base in said vehicle solvent in the same concentration as the concentration of said reaction product in the test solution used to determine $T_A$; and $T_b$ = light transmissibility in percent of a test solution of the ester base in the same solvent and at the same concentration as the concentration of said reaction product in the test solution used to determine $T_B$.

17. A process for the production of a vehicle base suitable for formulation with mineral spirits for the production of thixotropic coating compositions which comprises reacting with heat a polyamide resin, comprising the reaction product of a polymerized fatty acid with an alkylene polyamide having from two to four amine substituents, with an ester base selected from the group consisting of glyceride oils, oil-modified alkyd resins and varnish ester bodies until the following relationship is established:

$T_A=T_B-(T_b-T_a)$; wherein $T_A$ = light transmissibility in percent of a test solution of the reaction product in said mineral spirits wherein said test solution contains said reaction product in amount at least 25% by weight; and $T_B$ = light transmissibility in percent of a test solution of the reaction product in a solvent in which said reaction product, said polyamide resin and said ester base are all soluble at room temperature, and wherein said test solution contains said reaction product in the same concentration as the concentration of said reaction product in the test solution used to determine $T_A$;

$T_a$ = light transmissibility in percent of a test solution of the ester base in said vehicle solvent in the same concentration as the concentration of said reaction product in the test solution used to determine $T_A$; and $T_b$ = light transmissibility in percent of a test solution of the ester base in the same solvent and at the same concentration as the concentration of said reaction product in the test solution used to determine $T_B$.

References Cited in the file of this patent
UNITED STATES PATENTS

| | | |
|---|---|---|
| 2,663,649 | Winkler | Dec. 22, 1953 |
| 2,962,461 | Toussaint et al. | Nov. 29, 1960 |

UNITED STATES PATENT OFFICE
CERTIFICATE OF CORRECTION

Patent No. 3,096,193            July 2, 1963

George H. Tinker et al.

It is hereby certified that error appears in the above numbered patent requiring correction and that the said Letters Patent should read as corrected below.

Column 2, line 38, for "togtther" read -- together --; line 41, for "vheicle" read -- vehicle --; column 7, line 27, for "$T_a$", first occurrence, read -- $T_b$ --; line 40, for "ration" read -- ratio --; column 8, line 65, strike out "by"; column 12, line 28, before "polymerized" insert -- a --; column 14, line 32, before "amount" insert -- an --.

Signed and sealed this 4th day of February 1964.

(SEAL)
Attest:
ERNEST W. SWIDER

Attesting Officer

EDWIN L. REYNOLDS

Acting Commissioner of Patents